Dec. 6, 1927.
F. L. GIRARD
1,652,124
CONVERTIBLE SEAT FOR VEHICLES
Filed Aug. 30, 1926
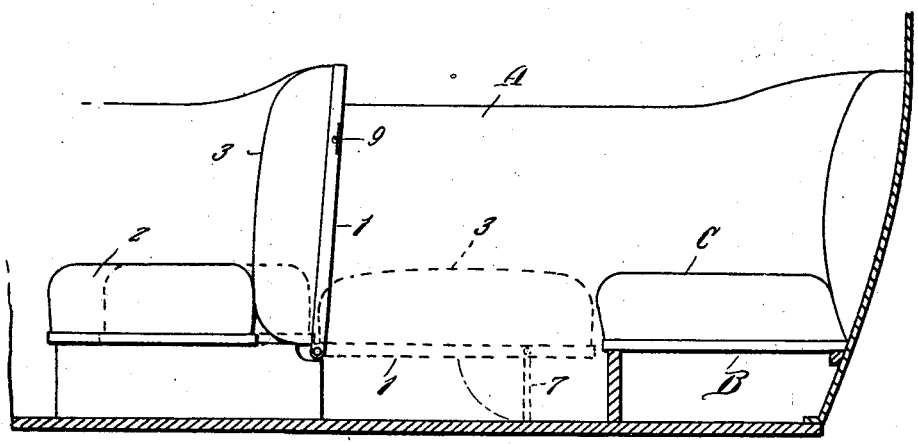
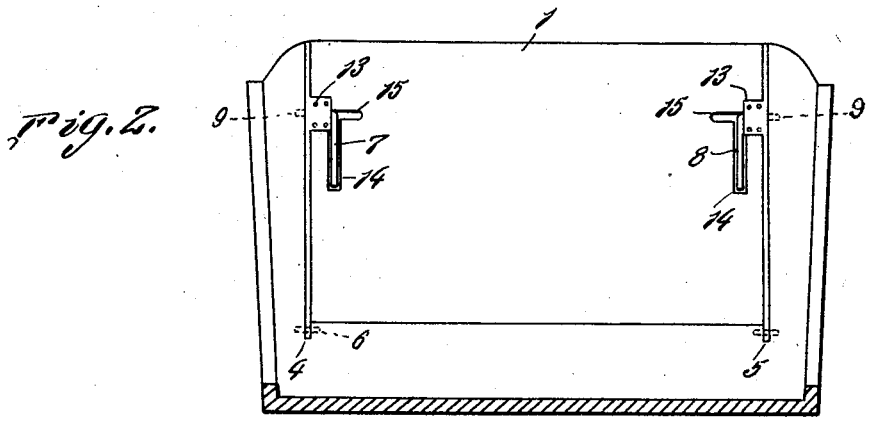
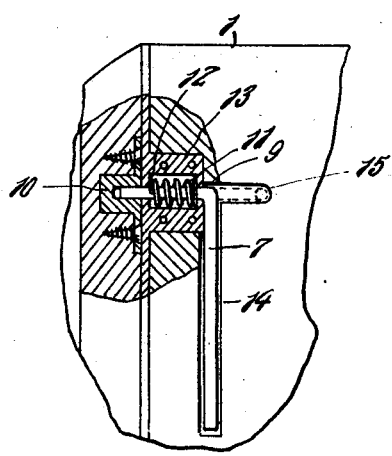
F. L. Girard
INVENTOR
BY Victor J. Evans
ATTORNEY Patented Dec. 6, 1927.

1,652,124

UNITED STATES PATENT OFFICE.

FRANK L. GIRARD, OF SILTCOOS, OREGON.

CONVERTIBLE SEAT FOR VEHICLES.

Application filed August 30, 1926. Serial No. 132,500.

This invention relates to convertible seats for vehicles, and its primary object is to provide a means whereby the seats of a vehicle such as an automobile may be converted into a reclining surface to be used as a bed or the like.

A further object of the invention is to provide a means for forming a reclining surface out of the seats of a two seated vehicle which includes a movable back for the front seat, with means for securing said back in vertical position or supporting the same in horizontal position for association with the seat cushions of the front and rear seats to provide a bed or the like.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a sectional view taken vertically through the body of a two seated vehicle and showing the back and bottom of the front seat in dotted lines when arranged to provide a reclining surface and in full lines when disposed in normal position.

Figure 2 is a rear view of the front seat.

Figure 3 is a fragmentary view of the back of the front seat with parts broken away to illustrate the means for latching the back in operative vertical position and supporting the same in horizontal position.

Referring to the drawings in detail the letter A indicates a fragmentary portion of a vehicle body and B the rear seat thereof which includes the usual seat cushion C.

The front seat has a movable back 1 and the usual seat cushion 2, and secured to the movable back 1 is a cushion 3. The back is pivoted to the rear frame of the seat as at 4 and 5 by pins 6.

The means for securing the back in its normal upright position and supporting the same in its horizontal position includes a pair of rods 7 and 8 having one of their ends bent at right angles as at 9 and being operatively held associated in keepers 10 as shown in Figure 3 of the drawings, by a coil spring 11. A pin 12 is transversely arranged through the ends 9 and the pins project upon opposite sides of the ends to receive one of the end convolutions of the coil spring, while the opposite end convolution engages the adjacent side of its casing 13. The casings 13 slidably house the ends 9 and are provided with openings adapted to align with the keepers when the back 1 is arranged in its normal upright position, so that the ends 9 may be positioned in the keepers as above pointed out. The back is formed with channel shaped grooves 14 to accommodate the body portion of the rods 7 and 8 when the back is disposed in its normal upright position, and grooves 15 register with the grooves 14 as shown, to receive the right angle ends 9 when the rods are removed from the keepers to lower the back as suggested by dotted lines in Figure 1. When the back is in its last mentioned position, the rods support the back so that its cushion is arranged in horizontal alignment with the seat cushion C of the back seat and the front cushion 2 is arranged in close proximity to the cushion 3, and all of these mentioned cushions provide a comfortable reclining surface as will be readily apparent.

It is thought from the foregoing description that the advantages and novel features of my invention will be readily apparent.

I desire it to be understood that I may make changes in the construction and in the combination and arrangement of the several parts, provided that such changes fall within the scope of the appended claim.

I claim:—

The combination with the seat cushions of a front and back seat of a motor vehicle, a movable back for the front seat and being pivotally secured at its lower end for movement thereof in a rearward vertical plane, casings secured in the back upon opposite sides thereof, a rod having a right angle bent end mounted for slidable movement in each of said casings, a keeper for each casing and being adapted to receive the right angle disposed ends for holding the back in its normal upright position, said back being provided with a groove to accommodate the body portion of the rods when the back is disposed in its normal upright position, and also being formed with grooves communicating with the grooves first mentioned to accommodate the right angle bent ends when the ends are removed from the keepers, coil springs adapted to urge said ends in the keepers, and said rods being adapted to support the back in a horizontal position so that the cushion thereof will be aligned with the seat cushions of the front and back seats to provide a bed.

In testimony whereof I affix my signature.

FRANK L. GIRARD.